Figure 1:
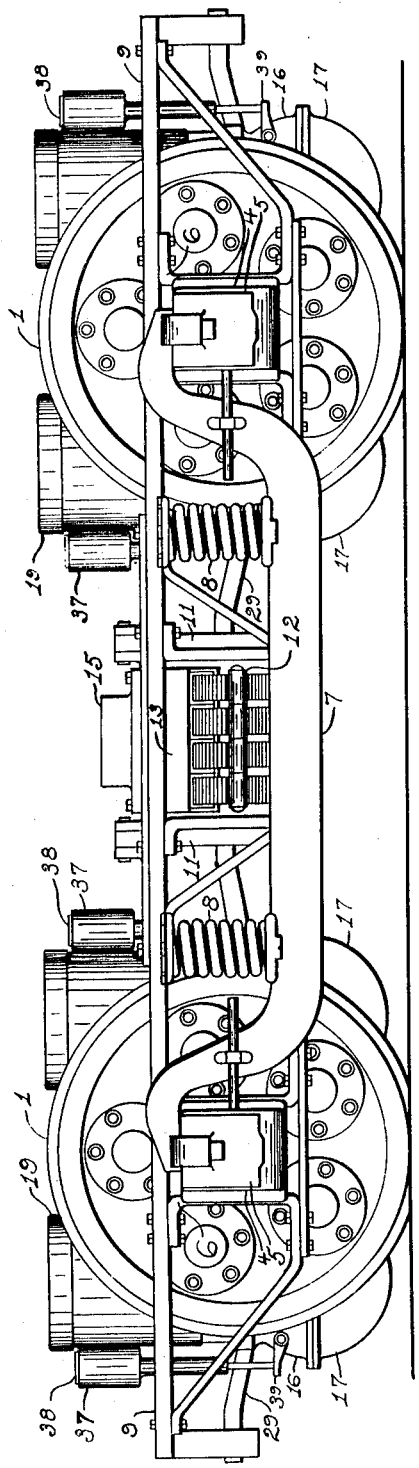

J. D. DONOVAN.
RAILWAY ENGINE FOR CARS AND LOCOMOTIVES.
APPLICATION FILED MAR. 17, 1909.

969,750.

Patented Sept. 6, 1910.
5 SHEETS—SHEET 1.

WITNESSES:

INVENTOR.

J. D. DONOVAN.
RAILWAY ENGINE FOR CARS AND LOCOMOTIVES.
APPLICATION FILED MAR. 17, 1909.

969,750.

Patented Sept. 6, 1910.
5 SHEETS—SHEET 4.

WITNESSES:

INVENTOR.

J. D. DONOVAN.
RAILWAY ENGINE FOR CARS AND LOCOMOTIVES.
APPLICATION FILED MAR. 17, 1909.

969,750.

Patented Sept. 6, 1910.

5 SHEETS—SHEET 5.

WITNESSES:

INVENTOR.

UNITED STATES PATENT OFFICE.

JAMES D. DONOVAN, OF KANSAS CITY, MISSOURI, ASSIGNOR, BY MESNE ASSIGNMENTS, OF TWO-THIRDS TO WILLIAM F. DAVIS, OF KANSAS CITY, MISSOURI.

RAILWAY-ENGINE FOR CARS AND LOCOMOTIVES.

969,750. Specification of Letters Patent. Patented Sept. 6, 1910.

Application filed March 17, 1909. Serial No. 484,024.

*To all whom it may concern:*

Be it known that I, JAMES D. DONOVAN, a citizen of the United States, residing at Kansas City, in the county of Jackson and State of Missouri, have invented certain new and useful Improvements in Railway-Engines for Cars and Locomotives, of which the following is a specification.

The invention relates to railway engines for cars and locomotives wherein the power is derived from the expansion of fluid against single acting reciprocating pistons working within a plurality of cylinders and seeks to provide a simple and effective form of fluid engine, free from perceptible vibration which may be flexibly mounted with the engine crank shaft in constant parallel position to the wheel axle and geared thereto. Railway car and locomotive wheels are rigidly secured to the wheel axles and the axles are provided with suitable journal bearings from which the truck frame is spring supported. It is essential that locomotive car wheels and axles shall be so connected to the truck frame that the wheels may follow the irregularities of the track and at the same time yieldingly support the truck frame. For this reason engines which are geared directly to the wheels or axle must be so mounted as to maintain parallel relations between the engine crank shaft and wheel axle at all times.

The present invention seeks to provide an improved form of fluid engine which is mounted on the wheel axle with a supporting arm extending to the truck frame, together with a gear drive to the axle, in my preferred construction through a friction clutch and to so distribute the cylinders as to give room for crank shaft bearings of a length sufficient to withstand the severe shocks and wear due to car and locomotive service.

A further object of the invention is to so distribute the engines as to provide room for a sufficient number of cylinders and of a size that their combined power will supply the demand for operating on steep hills or or to pull trains of cars.

With these and other objects in view, the invention consists in the features of construction, combinations and arrangements of parts hereinafter described, illustrated in the accompanying drawings and more particularly pointed out in the claims at the end of this specification.

Figure 2:
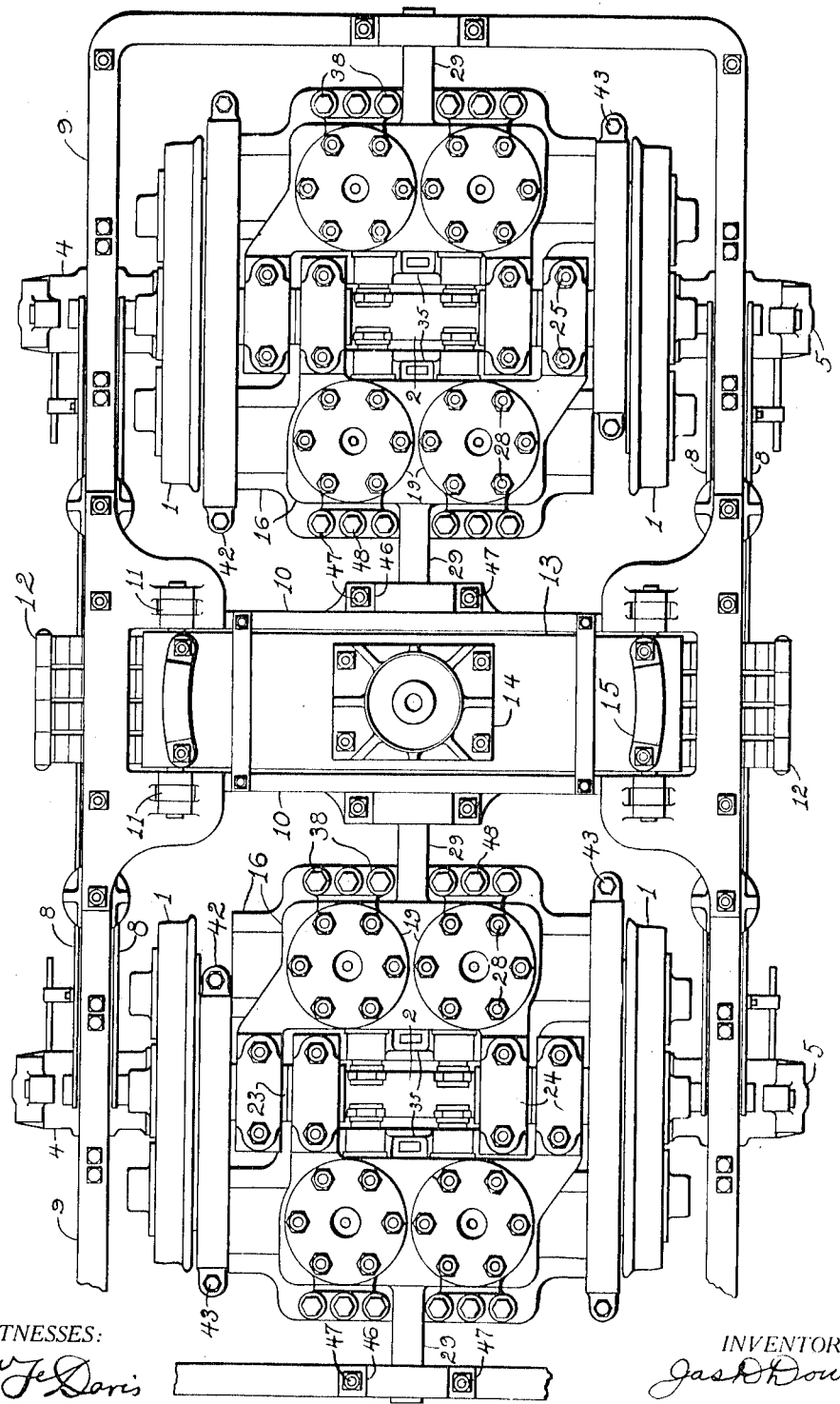
Figure 3:
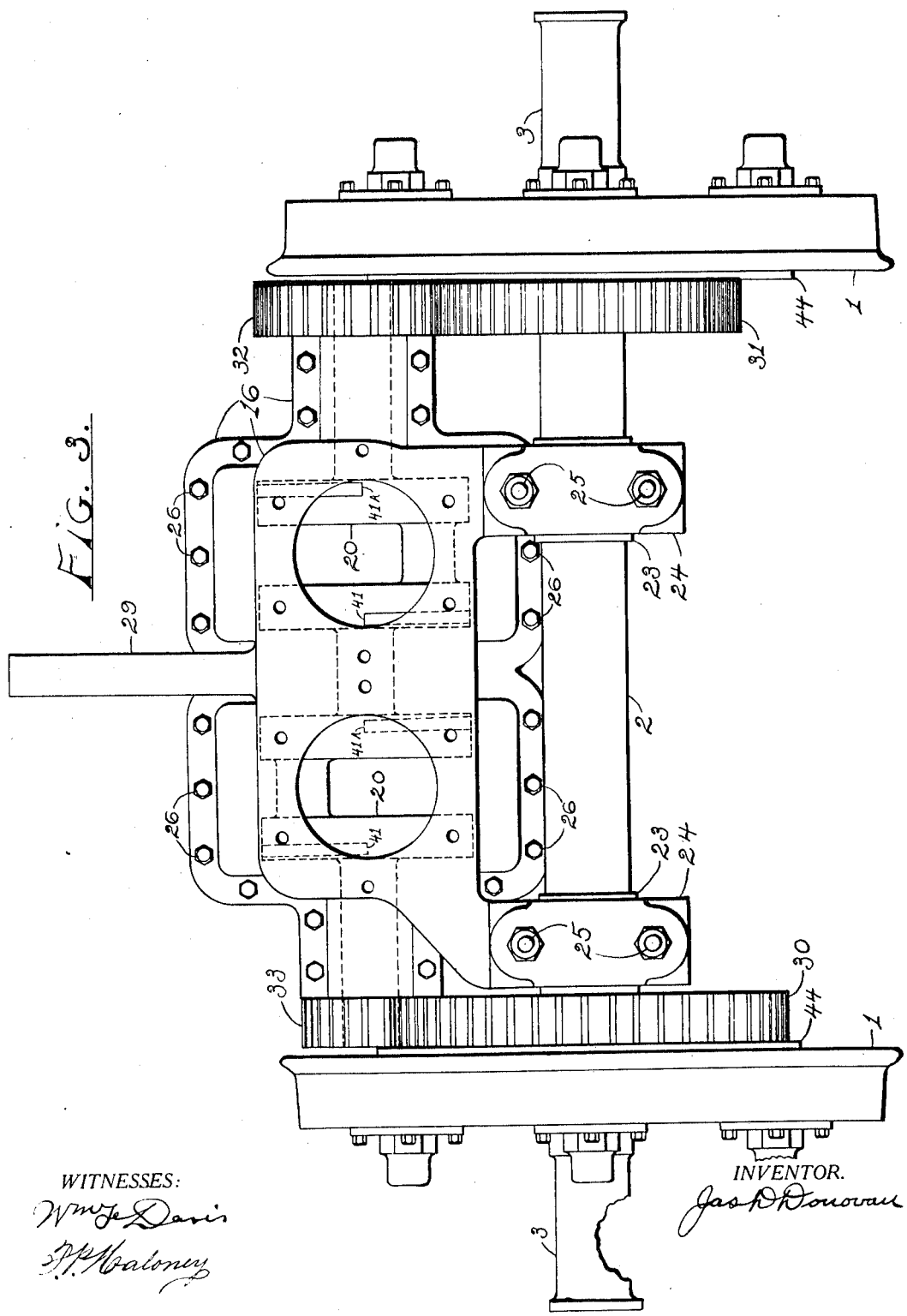
Figure 4:
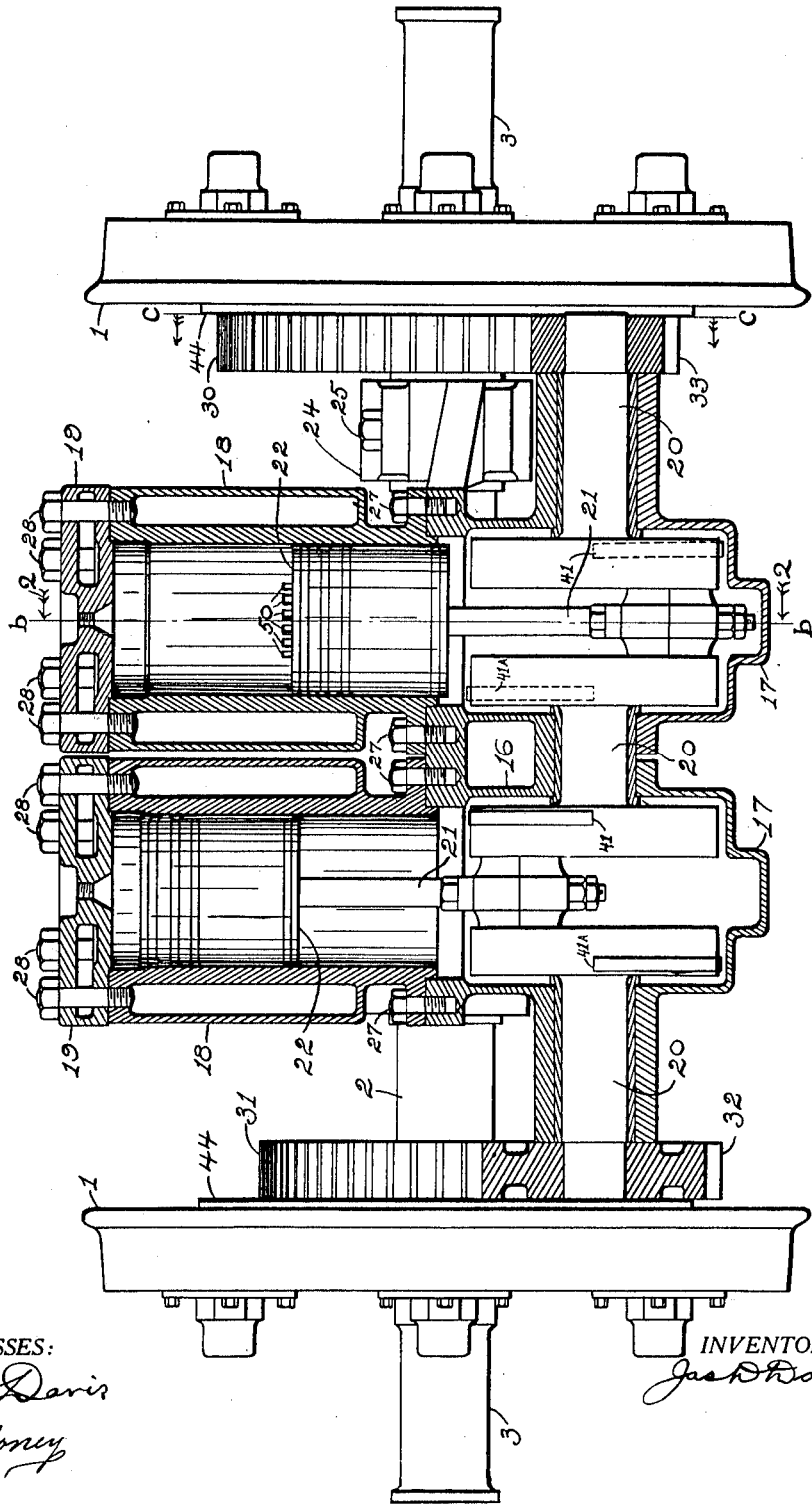
Figure 5:
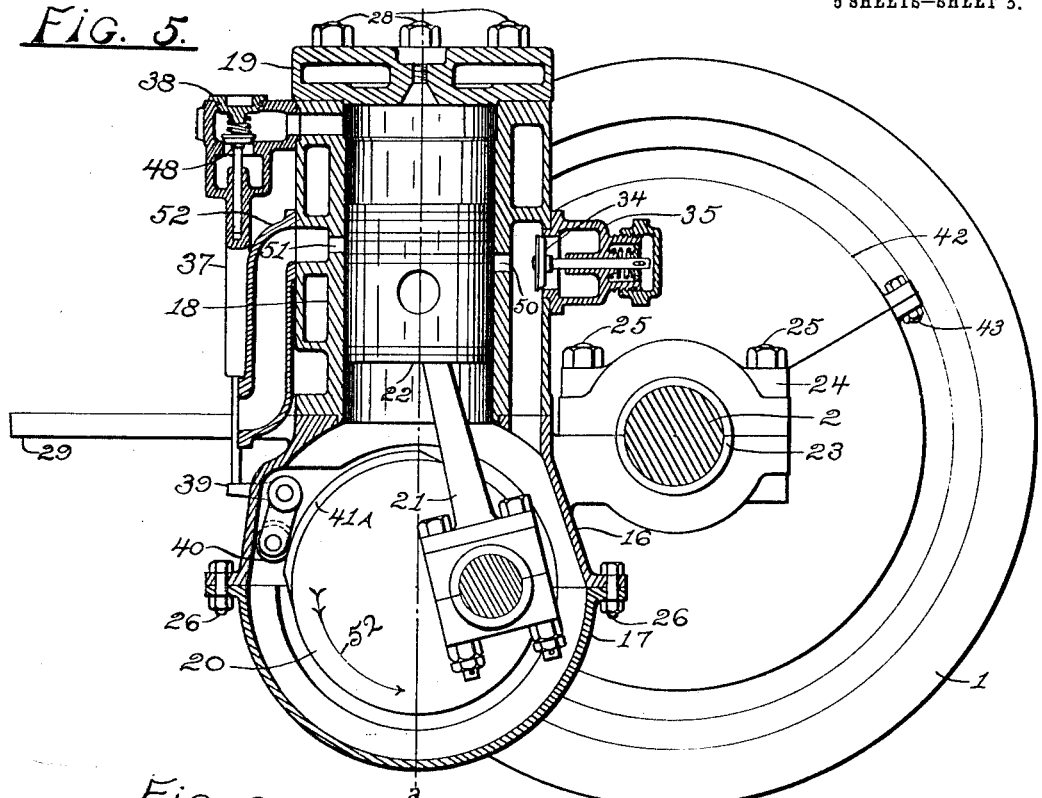
Figure 6:
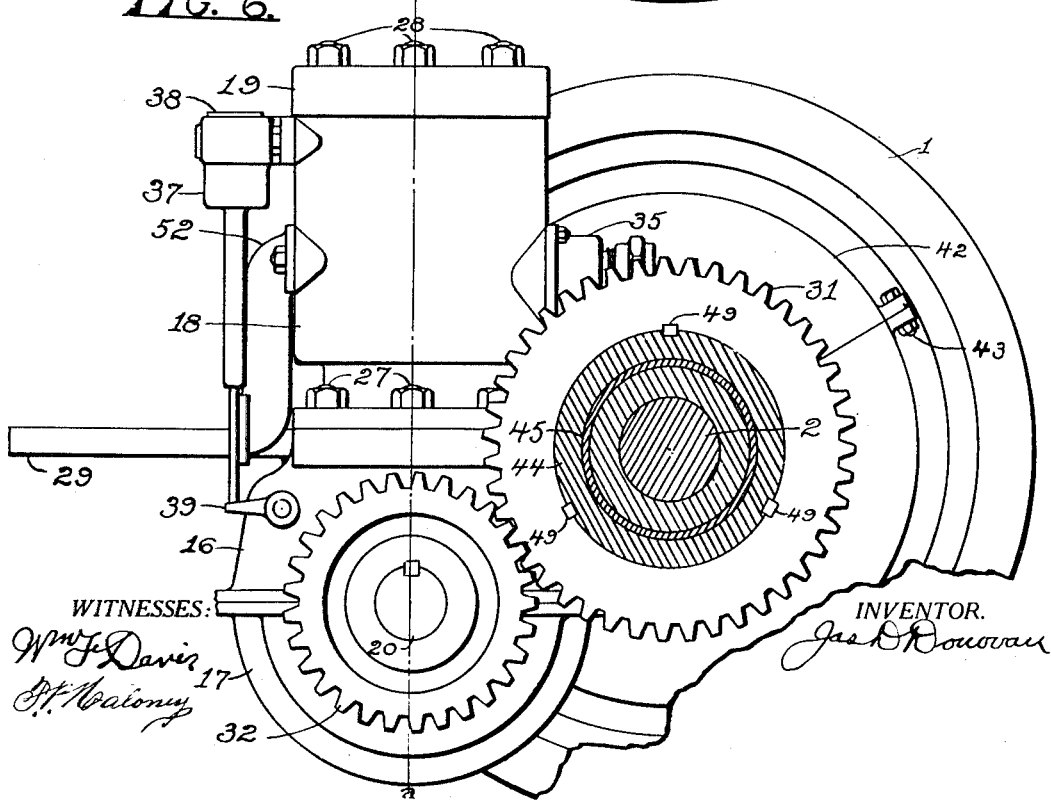

In the drawings Figure 1, is a view in elevation of a truck for railway cars or locomotives in which two of the improved engines are applied to each wheel axle. Fig. 2 is a plan of a truck for railway cars or locomotives in which two of the improved engines are applied to each wheel axle. Fig. 3 is a plan of a pair of railway car or locomotive wheels and axle with one of the improved engines mounted thereon, said engine having the cylinders, pistons and connecting rods removed. Fig. 4 is a vertical cross section on lines *a—a* of Figs. 5 and 6. Fig. 5 is a vertical longitudinal section on line *b—b* Fig. 4, looking in the direction arrows 2—2. Fig. 6 is a vertical longitudinal section on line *c—c* Fig. 4.

The car wheels 1 are rigidly secured to the axle 2 as usual. The axles extend beyond the wheels and have journals 3 to receive the journal boxes 4. The journal boxes are as usual provided with swinging covers 5 and are arranged to slide in the frame jaws 6 of the truck frame 9. Equalizer bars 7 rest upon the journal boxes and carry springs 8 which in turn carry the truck frame.

To the truck frame is secured the bolster box 10 from which depend the swinging bolster hangers 11, these in turn support the springs 12 on which rest the bolster 13. The bolster is mounted with a center plate 14 and side bearings 15, for the purpose of supporting a car or locomotive body or frame. The truck illustrated in Fig. 1 and Fig. 2 is a common type used in connection with what is usually termed double truck cars or locomotives.

It will be understood that the invention may be applied to trucks for single truck cars and locomotives and to other forms of trucks.

To the engine main frame 16 is bolted the journal caps 24 with bolts 25, thus forming journal boxes which support one side of the engine and hold it in alinement with the axle; in the form shown these boxes are provided with bushings 23; within the engine main frame is journaled the crank shaft 20 which once placed in alinement with the wheel axle will be rigidly held in that position, although the axle is free to revolve within the frame journals. From the side of the engine opposite the axle extends a supporting arm which is loosely connected to the truck frame by plates 46 and bolts 47. The engine frame is thus free to move up and down with the wheel axle and although the axles may diverge greatly from parallel relations to each other the crank shaft 20 remains in parallel position to the wheel axle 2. In the preferred construction the journal caps 24 are placed above the wheel axles 2 so that bolts 25 may be removed and the entire engine dropped from the wheel axle and easily removed from the truck for inspection or repairs.

In the form shown the journal boxes that support the engine on the wheel axle are so located as to allow the placing of two engines on a single axle, having one pair of wheels. This feature of placing two engines on one wheel axle is of material advantage, and by this means where a medium amount of power is required a sufficient number of engines can be placed on one or two wheel axles thus reducing complication. In placing the engines on one wheel axle the engine cranks will be so set that no two pistons will receive the maximum pressure at one time, from this it will be understood that two engines will give a more constant torque than one engine. Another advantage of this arrangement is obtained in the fact that two engines may be placed on each of the several wheel axles of a car or locomotive and the power or traction distributed through all the wheels so connected.

To the lower side of engine main frame 16 is bolted by bolts 26 the lower frame or crank case 17 thus inclosing the crank and forming an oil chamber from which the oil is sprayed to the bearings by the crank shaft 20 and connecting rods 21.

In the form shown the cylinders 18 are bolted to the engine main frame 16 by bolts 27 and are fitted with pistons 22 which are fitted with packing rings of any suitable shape.

The connecting rods 21 connect the pistons 22 to the crank shaft 20 and are free to swing in the pistons and the crank shaft is free to revolve within the lower end of said connecting rods.

In the form shown gear 30 and gear 31 are secured to friction clutch hubs as shown at 49, Fig. 6. A friction clutch for this purpose was invented by me and is illustrated in Letters Patent No. 890,760 issued to me, James Donovan, William F. Davis and Milton P. Davis, June 16, 1908, but I do not wish to restrict this present application to any particular form of friction clutch.

It will be understood that in the form of friction clutch referred to that gear 30 and gear 31 will be free to revolve around the wheel axle when the clutches are disengaged and that if either of the clutches was engaged, the wheel axle and both wheels secured thereto would turn with the respective gear.

The pinion 32 is secured to the crank shaft 20 and engages gear 31, thus when the engine is running and gear 31 is engaged by its respective friction clutch, motion is imparted to the truck wheels 1 and the car or locomotive to which the wheels are attached will move along the railway track. In like manner pinion 33 is secured to the opposite end of the crank shaft 20 and engages gear 30 which may be engaged to the wheel axle and truck wheels and disengaged by the friction clutch controlling said gear.

From the foregoing description it will be understood that when pinion 33 is driving the wheel axle and wheels by engagement with gear 30, a slower speed will be produced than when pinion 32 is driving the wheel axle and wheels through gear 31. The gear wheels are of different diameters to produce variation in speed. The car or locomotive will move in the direction in which the wheels are turned, which will depend upon the engine, said engine being reversible.

At 34 is shown a valve within a header 35 which in conjunction with supply ports 50 is for the purpose of operating the engine on fluid saturated with an explosive agent.

The engine may be operated with non-explosive fluid admitted through 36 which are fluid supply valves, working in cages 37, said cages are capped by cap 38. Valve 47 is a check against pressure within the cylinder while valves 36 are operated by rockers 39 through rollers 40 and cams 41 and 41^A. It will be understood from the position of the cams 41 and 41^A, that when fluid is admitted through the valve operated by cam 41 the engine will run in the direction indicated by arrow 52 while if fluid be admitted through valve operated by 41^A the engine will run in the opposite direction. The pressure is greatest when the pistons are at or near the upper end of the cylinder and continues through a greater part of the downward stroke. The exhaust is expelled through exhaust ports 51 when the pistons are at or near the lowest point of their travel.

The valves and valve operating mechanism is no part of my present application, as various combinations and arrangements can be used for the numerous classes of fluid such as air, steam and explosive mixtures with which the improved engines may be operated. The engine mechanism is of chief importance for operating railway cars and locomotives with an explosive mixture of hydrocarbon fluid but may be advantageously used with compressed air, steam or other fluid.

It is obvious that numerous changes may be made in the details set forth without departing from the essentials of the invention.

Having thus described my invention, what I claim as new and desire to secure by Letters Patent, is—

1. In combination with a pair of railway car or locomotive wheels and wheel axles, an engine frame adapted to receive vertical cylinders and journaled on said axle, bearings in said engine frame to receive a transverse crank shaft and means to hold said engine frame from rotating around said wheel axle, for the purpose set forth.

2. In combination with a railway car or locomotive wheel axle and pair of wheels, to which said wheel axle is secured, an engine frame adapted to receive vertical cylinders and supported by said wheel axle, said engine frame containing journal boxes to receive a transverse crank shaft and a supporting arm loosely connected to the truck frame of a car or locomotive, all for the purpose set forth.

3. In combination with a pair of car or locomotive wheels and wheel axle secured therein, an engine frame journaled on said axle between said wheels, cylinders arranged vertically on said engine frame, pistons in said cylinders, connecting rods connecting said pistons to a transverse crank shaft journaled in said frame and means to hold said engine frame from turning over and around said wheel axle, substantially as set forth.

4. In combination with a railway car or locomotive wheel axle and wheels secured thereon, an engine frame journaled to said axle between said wheels, cylinders arranged vertically and secured to said engine frame, pistons in said cylinders, connecting rods connecting said pistons to a transverse crank shaft journaled in said engine frame, a gear secured to said crank shaft, a coöperating gear encircling said wheel axle, and means to hold said engine frame from rotating around said wheel axle, substantially as set forth.

5. In combination with a railway car or locomotive wheel axle and wheels secured thereto, an engine frame journaled to said wheel axle between said wheels, cylinders arranged vertically and secured to said engine frame, pistons in said cylinders, connecting rods connecting said pistons to a transverse crank shaft journaled to said engine frame, a gear on each end of said crank shaft, coöperating gears encircling said wheel axle, means to engage said last named gear to the wheels or wheel axle and means to hold said engine frame from rotating around the wheel axle, substantially as set forth.

6. The combination of a pair of railway car or locomotive wheels and a wheel axle secured thereto, an engine frame, journaled to said wheel axle, vertical cylinders extending upward from said engine frame pistons in said cylinders, connecting rods connecting said pistons to a transverse crank shaft journaled to said engine frame, a gear secured to said crank shaft, a coöperating gear encircling said wheel axle, means to drive said wheel axle with said gears and means to hold said engine in working position, substantially as set forth.

7. The combination of a pair of railway car or locomotive wheels and a wheel axle secured thereto, an engine frame, journaled to said wheel axle, vertical cylinders extending upward from said engine frame, pistons in said cylinders, connecting rods connecting said pistons to a transverse crank shaft journaled to said engine frame, a gear secured to each end of said crank shaft, coöperating gears encircling said wheel axle, means to drive said wheel axle and said wheels with said gears and means to hold said engine frame in working position substantially as set forth.

8. The combination of a pair of railway car or locomotive wheels and a wheel axle secured therein, an engine having a transverse crank shaft and a plurality of vertical cylinders, said engine located in front of said wheel axle, bearings extending from the rear of said engine and coinciding with journals on said wheel axle, and means to support the forward side of said engine, for the purpose set forth.

9. The combination of a pair of railway car or locomotive wheels and a wheel axle secured therein, an engine having a transverse crank shaft and a plurality of vertical cylinders, said engine located in the rear of said wheel axle, bearings extending from the front of said engine and coinciding with journals on said wheel axle, and means to support the rear side of said engine for the purpose set forth.

10. The combination of a pair of railway car or locomotive wheels and a transverse crank shaft and a wheel axle secured therein, an engine having a plurality of vertical cylinders, bearings connecting said engine to journals on said wheel axle, a crank shaft in said engine, pistons to drive said crank shaft, means to drive said wheel axle, and wheels from said crank shaft and means to hold said engine in working position, substantially as described.

11. The combination of a pair of railway car or locomotive wheels, a wheel axle secured therein, an engine with vertical cylinders and bearings connecting to journals on said wheel axle, a transverse crank shaft in said engine located lower than said wheel axle, said crank shaft having an axis parallel to the axis of said wheel axle, means to drive said wheel axle and wheels from said crank shaft and means to support a portion of the weight of said engine on the truck frame of a locomotive or car for the purpose set forth.

12. The combination of a pair of railway locomotive or car wheels and a wheel axle secured therein, an engine with vertical cylinders supported in part by said wheel axle, means to support the other part of said engine, said engine having a transverse crank shaft below but not directly under said wheel axle, said engine having cylinders above but not directly over the wheel axle and means to drive said wheels and wheel axle by said engine for the purpose set forth.

13. The combination of a pair of railway car or locomotive wheels, a wheel axle secured therein, a vertical engine having a plurality of vertical cylinders, bearings to support a portion of the weight of said engine by journals on said wheel axle, a transverse crank shaft revoluble in suitable bearings, pistons to drive said crank shaft, means to turn said wheel axle and said wheels by said crank shaft and means to support the portion of the weight of said engine not supported on the wheel axle, substantially as described.

14. The combination of a pair of railway car or locomotive wheels, a wheel axle secured therein, a vertical engine having a plurality of cylinders, said engine provided with bearings to support one side of said engine on the wheel axle, means to support the opposite side of said engine, a transverse crank shaft journaled in said engine, said crank shaft having the axis thereof parallel to the axis of said wheel axle, pistons and connecting rods to turn said crank shaft, means to turn said wheels and wheel axle with said crank shaft, substantially as described.

15. The combination of a pair of railway car or locomotive wheels and a wheel axle secured therein, an engine hung from said wheel axle, said engine having a plurality of cylinders, said cylinders extending higher than the wheel axle, a crank shaft in said engine, said crank shaft located lower than said wheel axle, the axis of said crank shaft parallel to the axis of said wheel axle, gears of different diameters on said crank shaft, coinciding gears encircling the wheel axle, means to drive the wheel axle and wheels through either coinciding pair of said gears and means to support one side of said engine within the truck frame of a car or locomotive, substantially as described.

16. The combination of a pair of railway car or locomotive wheels, a wheel axle secured therein, an engine having a plurality of cylinders, journal boxes on the frame of said engine to receive said wheel axle, a crank shaft journaled in said engine frame, gears of different diameters on said crank shaft, coöperating gears of different diameters encircling said wheel axle and means to drive said wheel axle and wheels through either pair of coinciding gears, substantially as set forth.

17. The combination of a pair of railway car or locomotive wheels, a wheel axle secured therein, an engine having a plurality of vertical cylinders, journal boxes on the frame of said engine to receive said wheel axle, a crank shaft journaled in said engine frame, two pair of gears connecting said crank shaft to said wheel axle, each pair of gears of a different ratio, said gears on said axle revoluble around said axle, and means to engage either of said gears to said axle, substantially as described.

18. The combination of a pair of railway car or locomotive wheels, and a wheel axle secured therein, an engine having a plurality of cylinders, said engine mounted on said wheel axle, a crank shaft in the frame of said engine, a gear on said crank shaft, a connecting gear mounted on the hub of a friction clutch, said gear encircling the axle, substantially as described.

19. The combination of a pair of railway car or locomotive wheels, and a wheel axle secured therein, a friction clutch mounted in one of said wheels, a gear mounted on the inner hub of said clutch, an engine mounted on the axle between said wheels, the cylinders of said engine being higher than the axle, a crank shaft in the frame of said engine, said crank shaft being lower than said wheel axle, a gear mounted on said crank shaft, said gear coinciding with said gear on said clutch hub, pistons in said cylinders, connecting rods connecting said pistons with said crank shaft and means to support a part of the weight of said engine on the truck frame of a car or locomotive, substantially as described.

20. The combination of a pair of railway car or locomotive wheels and a wheel axle secured therein, friction clutches mounted within said wheels, gears of different diameters connected to said clutches, coinciding gears secured to a crank shaft, said crank shaft journaled within an engine frame at a point lower than the wheel axle, said engine connected to said wheel axle by suitable bearings, said engine having a plurality of cylinders extending above the wheel axle, pistons in said cylinders, connecting rods connecting said pistons to said crank shaft and means to support a portion of the weight of said engine on the truck of a railway car or locomotive, substantially as described.

21. The combination of a pair of railway car or locomotive wheels and a wheel axle secured therein, an engine with plural cylinders and a frame journaled on said wheel axle at one side, the opposite side of said engine supported on the truck frame of a car or locomotive, a crank shaft journaled in said engine frame and held in parallel relation to said wheel axle, a gear secured to each end of said crank shaft, said gears of different diameters, a gear loosely mounted adjacent each car or locomotive wheel, said last named gears of different diameters and coinciding with said first named gears on said crank shaft, and friction clutches to engage either loosely mounted gear to the coinciding car or locomotive wheel, substantially as described.

22. The combination of a railway car or locomotive axle and pair of wheels secured thereto, a vertical engine with plural cylinders, hung adjacent to said wheel axle, and connected thereto by journal bearings, a crank shaft journaled in the frame of said engine, pistons and connecting rods to drive said crank shaft and gears connecting said crank shaft to said wheel axle, with a friction clutch interposed between, substantially as described.

23. The combination of a railway car or locomotive axle and pair of wheels secured thereto, a vertical engine with plural cylinders, hung adjacent to said wheel axle and connected thereto by journal bearings, a transverse crank shaft journaled in said engine, pistons and connecting rods to drive said crank shaft and gears connecting said crank shaft to said wheel axle with friction clutches interposed between, substantially as described.

24. The combination of a pair of railway car or locomotive wheels, a wheel axle secured therein, a vertical engine comprising plural cylinders, journal boxes on the frame of said engine to receive said wheel axle, a crank shaft journaled in the frame of said engine, two pair of gears, each pair of said gears having a different ratio, means to drive said wheel axle and wheels through either of said pair of gears, truck boxes on said wheel axle, a car or locomotive truck frame spring supported on said boxes and means on said truck frame to hold said engine in working position, substantially as described.

25. The combination of a pair of railway car or locomotive wheels and wheel axle secured to said wheels, a vertical engine comprising plural cylinders between said wheels, a crank shaft journaled in the frame of said engine, gears on said crank shaft, gears encircling said wheel axle, said gears coöperating with said gears on said crank shaft, means for engaging either gear on said wheel axle with said coöperating gear on the crank shaft, said wheel axle having extending portions outside of said wheels, journal boxes on said extending portions, a truck frame supported on said journal boxes and means to support a portion of the weight of said engine on the truck frame.

26. The combination of a pair of railway car or locomotive wheels, a wheel axle secured to said wheels, said axle having journals between said wheels adapted to support a portion of the weight of a plural cylinder vertical engine, said wheel axle extending outwardly beyond said wheels, said extending portion provided with journal bearings, journal boxes on said bearings, equalizer bars resting on said boxes, springs on said equalizer bars, a truck frame supported by said springs and means on said truck frame to support the portion of said engine not supported by said bearings on said wheel axle.

27. The combination of a pair of railway locomotive or car wheels, a wheel axle secured in said wheels, said wheel axle having extending portions outside of both wheels, a journal box on each of said extending portions, a car or locomotive frame supported on said journal boxes, means to support a portion of the weight of a plural cylinder engine on said frame and journals on said wheel axle between said car or locomotive wheels to support the weight of said engine not supported on said car or locomotive frame, gear connections from the crank shaft of said engine to said wheel axle and friction clutches interposed between said gear connections and said wheel axle, substantially as described.

28. The combination of a pair of railway car or locomotive wheels and wheel axle secured thereto, journals on said axle outside of said wheels, journal boxes on said journals, a truck frame spring supported by said journal boxes, two vertical engines connected to said wheel axle, each of said engines having a plurality of cylinders and journal bearings on said wheel axle, supporting arms resting in receptacles in said truck frame and means to drive said wheel axle and wheels from said engines, substantially as described.

29. The combination of a pair of railway car or locomotive wheels and wheel axle secured thereto, journal boxes on said wheel axle, equalizing bars supported by said journal boxes, springs connecting said equalizer bars to a locomotive or car truck frame, two vertical engines connected to said wheel axle, each of said engines having a connecting support on said truck frame, gears connecting each of said engines to said wheel axle and friction clutches to engage and disengage said gear connections, substantially as described.

30. The combination of a pair of railway car or locomotive wheels and wheel axle secured thereto, truck journals on said wheel axle, truck boxes on said journals, a truck frame a portion of which is spring supported by said truck boxes, two plural cylinder vertical engines, each of said engines supported in part by said truck frame, each of said engines having journal boxes to receive the wheel axle, each of said engines provided with a crank shaft, pistons and connecting rods to drive each of said crank shafts, each crank shaft having two gear connections to said wheel axle and friction clutches interposed between, substantially as described.

31. The combination of a pair of railway car or locomotive wheels and a wheel axle to which said wheels are fixed, journals on said wheel axle, a car or locomotive truck frame spring supported by said journals, two engines mounted on said wheel axle, each of said engines having plural cylinders and an individual crank shaft, gear connections from each of said crank shafts to said wheel axle, substantially as described.

32. The combination of a pair of railway car or locomotive wheels and a wheel axle to which said wheels are fixed, a car or locomotive frame supported by said axle, two reciprocating piston engines each individually journaled to said wheel axle, means to transmit the power of either or both engines to said wheel axle and means to hold said engine against torsional strains caused by said transmission, substantially as described.

33. The combination of plural wheel axles for railway cars or locomotives, wheels fixed to each of said axles, a car or locomotive frame supported by said wheel axles, plural cylinder engines each individually connected to one of the said wheel axles, said engines held against torsional effects of transmission by rests on said car or locomotive frame, gears connecting said engines to their respective wheel axles, and friction clutches interposed in said gear connections, substantially as described.

34. The combination of plural wheel axles for railway cars or locomotives, wheels fixed to each of said wheel axles, a frame to support a car or locomotive body, said frame spring supported by said plural wheel axles, two engines connected to each of said wheel axles, each engine provided with plural cylinders and a crank shaft, each of said crank shafts connected to their respective wheel axles through pairs of gears, friction clutches to engage and disengage either of the several pairs of gears from their respective wheel axles and means to hold said engines in a working position, substantially as described.

JAMES D. DONOVAN.

Witnesses:
WILLIAM F. DAVIS,
JEFFERSON D. KIRKPATRICK.